(12) United States Patent
Fujiwara et al.

(10) Patent No.: US 6,512,794 B1
(45) Date of Patent: Jan. 28, 2003

(54) RECEIVER AND TRANSMITTER-RECEIVER

(75) Inventors: Seigo Fujiwara, Settsu (JP); Hideki Otaka, Neyagawa (JP); Takayasu Yoshida, Osaka (JP); Yukio Nakagawa, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/509,416

(22) PCT Filed: Jul. 21, 1999

(86) PCT No.: PCT/JP99/03911

§ 371 (c)(1),
(2), (4) Date: May 23, 2000

(87) PCT Pub. No.: WO00/07369

PCT Pub. Date: Feb. 10, 2000

(30) Foreign Application Priority Data

Jul. 30, 1998 (JP) .......................................... 10-215230

(51) Int. Cl.[7] .............................................. H04N 7/58
(52) U.S. Cl. .............................. 375/240.26; 375/240.28
(58) Field of Search ....................... 375/240.01, 240.26, 375/240.28; H04N 7/58

(56) References Cited

U.S. PATENT DOCUMENTS 6,049,568 A * 4/2000 Kagawa ................. 375/240.28
6,356,591 B1 * 3/2002 Kagawa ................. 375/240.26

FOREIGN PATENT DOCUMENTS

| JP | 8256330 A | 1/1996 |
|----|-----------|--------|
| JP | 8-307455 | 11/1996 |
| JP | 10-56615 | 2/1998 |
| JP | 11027660 A | 1/1999 |
| WO | WO 98/15121 | 9/1998 |

OTHER PUBLICATIONS

Integrating Digital Audio into the Serial Digital Video Signal, David K. Fibush, SMPTE Journal, Sep. 1994, pp 574–579.
The Journal of the Institute of Image Information and Television Engineers, vol. 51 No. 11 1997.

* cited by examiner

Primary Examiner—Howard Britton
(74) Attorney, Agent, or Firm—Pearne & Gordon LLP

(57) ABSTRACT

The receiver and transmitter/receiver in accordance with the present invention comprises a common input terminal for inputting digital data including uncompressed video data or compressed video data, a receiving circuit for carrying out serial-parallel conversion processing for the digital data from the above-mentioned common input terminal and for carrying output, an SDI decoder and an SDTI decoder for inputting data from the above-mentioned receiving circuit and for taking out the digital data including the uncompressed video data and compressed video data, respectively, a distinguishing circuit for distinguishing the transmission format of the input digital data and the presence or absence of the compression of the video data, and a selection switch for selecting data from the SDI decoder or the SDTI decoder on the basis of the result of the distinguishing of the distinguishing circuit.

7 Claims, 7 Drawing Sheets

RECEIVER AND TRANSMITTER-RECEIVER

FIELD OF THE INVENTION

The present invention relates to a receiver and a transmitter/receiver for digital data including video data and audio data, and more particularly to a receiver and a transmitter/receiver suitable for a recording/reproducing apparatus for recording/reproducing uncompressed video data and compressed video data.

BACKGROUND ART

At present, as a transmission method for digital video signals, the SMPTE-259M Standard, namely, the Serial Digital Interface (hereinafter referred to as "SDI") Standard is used generally. As is known, this SDI Standard was established by SMPTE: Society of Motion Picture and Television Engineers, and stipulates methods of converting digital data including video data and audio data into serial data and transmitting the data.

Hereinafter, the digital data transmission method in accordance with the SDI Standard will be described specifically with reference to FIG. 4. In the following description, the transmission method in accordance with the television signal of the NTSC System at 270 Mbps will be described.

FIG. 4 is an explanatory view showing the configuration of one frame in accordance with the SDI Standard. The straight line H in FIG. 4 indicates the horizontal pixels of the television signal, and the numerical values above the straight line H indicate pixel numbers. The straight line V in the same figure indicates the vertical line of the television signal, and the numerical values above the straight line V indicate line numbers.

As shown in FIG. 4, in the SDI Standard, one frame period is divided into a horizontal blanking period, and a vertical blanking period, an optional blanking period and an active video period in each field of a first field and a second field constituting one frame.

The horizontal blanking period is stipulated by the range of the horizontal pixels from pixel number 1440 to 1715. In the horizontal blanking period, its head and end portions are provided with EAV (End of Active Video) and SAV (Start of Active Video), respectively. In the horizontal blanking period between these EAV and SAV, it is possible to transmit ancillary data, such as audio data and user data.

In the active video period, video data for 1440 pixels is multiplexed in every line, and transmitted as serial data at a predetermined clock frequency. One pixel is formed of 8-bit or 10-bit video data.

In the optional blanking period, a period included in the vertical blanking period, video data can be placed and transmitted, just as in the case of the active video period.

By using this SDI Standard, the 4:2:2 component television signal for one channel can be transmitted without using any analog transmission systems, whereby signal deterioration can be prevented.

On the other hand, when video data obtained by digitizing a video signal is processed directly, the data amount of the video data becomes large, thereby requiring a very high data rate (transmission speed). Therefore, when the above-mentioned video data is recorded on a recording medium, such as magnetic tape, for example, sufficient recording time cannot be obtained.

In contrast, a method, wherein video data is compressed by bit rate reduction to the extent that visual deterioration in image quality is not recognized, and then treated, is known as an effective method. More specifically, the DV format established by the High Definition Digital Video Cassette Recorder Committee and described in "Specifications of Consumer-Use Digital VCRs using 6.3 mm magnetic tape" is available as a format obtained by applying the bit rate reduction of a video signal to consumer-use digital VTRs.

In this DV format, data is compressed in two modes depending on the television signal by carrying out bit rate reduction on the basis of DCT (Discrete Cosine Transform).

More specifically, in the DV format, the standard television signal is compressed to 25 Mbps data, and the high definition television signal is compressed to 50 Mbps data. The compressed video data is recorded on magnetic tape together with interleaved audio data, VAUX data used as data attached to the video data, sub-code data and the like. When the data compressed in the 25 Mbps mode is recorded on the magnetic tape, the data for one frame is divided into 10 tracks of the magnetic tape and recorded. In addition, when the data compressed in the 50 Mbps mode is recorded on the magnetic tape, the data for one frame is divided into 20 tracks of the magnetic tape and recorded.

When the video data compressed by bit rate reduction, such as the DV format, is transmitted by using the above-mentioned SDI Standard, it was conventionally necessary to release the compression of the video data once and to return to a base band signal. This is because the SDI Standard stipulates only the transmission method for non-compressed video data, namely, uncompressed video data, instead of compressed video data. Furthermore, the SDI Standard is aimed at video data for one channel, and does not stipulate any transmission methods for transmitting video data for multiple channels.

Therefore, a transmission method capable of multiplexing and transmitting compressed video data by using the SDI Standard without returning the compressed video signal to the base band signal was requested earnestly. To meet this kind of request, the above-mentioned Society of Motion Picture and Television Engineers established the SMPTE-305 Standard, namely, the Serial Data Transport Interface, hereinafter referred to as "SDTI"). By using this SDTI Standard, video signals for multiple channels, compressed in accordance with the DV format and MPEG (Moving Picture Experts Group) for example, can be transmitted in accordance with the SDI Standard.

Hereinafter, the digital data transmission method in accordance with the SDTI Standard will be elucidated specifically with reference to FIG. 5. In the following, just as in the case of the SDI Standard shown in FIG. 4, the transmission method in accordance with the television signal of the NTSC System at 270 Mbps will be described.

FIG. 5 is an explanatory view showing a concrete example of the configuration of one frame in accordance with the SDTI Standard.

As shown in FIG. 5, in the SDTI Standard, a one-frame period is provided with EAV, SAV, a horizontal blanking period therebetween, vertical blanking periods and optional blanking periods, just as in the case of the SDI Standard shown in FIG. 4. Furthermore, in the SDTI Standard, areas referred to as payloads corresponding to the active video period in the SDI Standard are provided so that digital data including compressed video data is placed and transmitted. Moreover, the above-mentioned horizontal blanking period in accordance with the SDI Standard is used as a physical layer wherein ancillary data can be placed. However, the type of the ancillary data to be transmitted in accordance with the SDI Standard differs from that in accordance with the SDTI Standard. More specifically, in the SDI Standard, the ancillary data was audio data, user data or the like as described in the above. On the other hand, in the SDTI Standard, audio data is stipulated so as to be placed in the above-mentioned payloads together with compressed video data, and transmitted. Therefore, the SDTI Standard stipulates that data referred to as an SDTI header is generated in every line in accordance with digital data to be placed in the subsequent payload, and placed and transmitted as ancillary data.

Hereinafter, the SDTI header stipulated in the above-mentioned SDTI Standard will be elucidated specifically with reference to FIG. 6. In the following description, data to be transmitted on the basis of the SDI Standard and data to be transmitted on the basis of the SDTI Standard are simply referred to as SDI data and SDTI data, respectively.

FIG. 6 is an explanatory view showing a specific configuration of the SDTI header.

As shown in FIG. 6, in the SDTI header, the data of ADF (Ancillary Data Flag) is placed subsequent to the data of EAV indicating the end of the active video period. The values of ADF and EAV shown in FIG. 6 are stipulated in the SDTI Standard, and are fixed values assigned to the SDI data and the SDTI data in common. In addition, in the SDTI header, the data of DID (Data ID) and the data of SDID (Secondary Data ID) are stored to identify the ancillary data placed in the horizontal blanking period. The values DID=140 and SDID=101 shown in the same figure indicate that the ancillary data is the SDTI header.

Furthermore, the SDTI header is provided with areas, such as Code and Block Type. The code is information used for identifying that the length of the subsequent payload is 1440 words (one word is a word length of 10 bits) or 1920 words for one line, or that the digital data stored in the payload is SDI data. In other words, the SDTI Standard stipulates three fixed values as code values used to identify the above-mentioned 1440 words, 1920 words and SDI data, respectively. The block Type is information used to indicate the length of the block of the compressed video data placed in the payload in block units.

By using the information included in the above-mentioned SDTI header, without checking the digital data in the payload, it is possible to recognize that the digital data is SDTI data.

Returning to FIG. 5, digital data including compressed video data is placed in the payload. When video data compressed in accordance with the DV format is transmitted for example, the video data compressed to 25 Mbps, interleaved audio data, VAUX data, AAUX data and sub-code data are formed into blocks and placed in the payload.

As described in the above, in the SDTI Standard, the SDTI header is added within the horizontal blanking period, and digital data including compressed video data is placed in the payload. For this reason, the SDTI Standard can transmit the above-mentioned digital data including compressed video data by using a transmission path based on the conventional SDI Standard.

A conventional receiver for receiving the above-mentioned SDI data and SDTI data will be elucidated below specifically with reference to FIG. 7.

FIG. 7 is a block diagram showing a configuration of the conventional receiver.

As shown in FIG. 7, the conventional receiver, as an SDI-based processing circuit for receiving and processing SDI data transmitted from an external device, is provided with an input terminal 51, a receiving circuit 52, an SDI decoder 53, a bit rate reduction circuit 54 and a multiplex circuit 56 sequentially connected to the above-mentioned input terminal 51, and an audio processing circuit 55 connected between the SDI decoder 53 and the multiplex circuit 56. The receiving circuit 52 receives the SDI data input to the input terminal 51, carries out serial-parallel conversion processing for the received SDI data, and outputs to the SDI decoder 53. The SDI decoder 53 separates video data and audio data from the SDI data, and outputs to the bit rate reduction circuit 54 and the audio processing circuit 55, respectively. The bit rate reduction circuit 54 carries out compression coding processing for the video data so that the input video data has a predetermined amount of data or less, and outputs to the multiplex circuit 56. The audio processing circuit 55 carries out predetermined data processing including interleave processing for the input audio data, and outputs to the multiplex circuit 56 to record on a subsequent recording medium 63. The multiplex circuit 56 multiplexes the video data from the bit rate reduction circuit 54 and the audio data from the audio processing circuit 55 in a predetermined sequence.

Furthermore, the conventional receiver, as the SDTI-based processing circuit for receiving and processing SDTI data transmitted from an external device, is provided with an input terminal 57, and a receiving circuit 52', an SDTI decoder 58 and a delay circuit 59 sequentially connected to the above-mentioned input terminal 57. The receiving circuit 52' receives the SDTI data input to the input terminal 57, carries out serial-parallel conversion processing for the received SDTI data, and outputs to the SDTI decoder 58. The SDTI decoder 58 carries out deformatting processing for the input SDTI data, and outputs to the delay circuit 59. In other words, the SDTI decoder 58 takes out the compressed video data, the interleaved audio data, the VAUX data, the AAUX data and the sub-code data from the data blocks placed in the payloads, and outputs to the delay circuit 59. The delay circuit 59 outputs digital data including the compressed video data from the SDTI decoder 58 with a predetermined time delay.

Furthermore, the conventional receiver is provided with a selection switch 60 connected to the above-mentioned multiplex circuit 56 and the delay circuit 59 and operating on the basis of a control signal from a control circuit 61 in order to output the output data from the SDI-based processing circuit or the SDTI-based processing circuit to the recording medium 63 via a record processing circuit 62. The selection switch 60 carries out selection between the multiplex circuit 56 and the delay circuit 59 on the basis of the control signal input from the control circuit 61, and outputs data output from one of the circuits to the record processing circuit 62. To the selection switch 60, the control circuit 61 outputs the control signal corresponding to a command signal from an external selector not shown. This external selector is included in a known input device for inputting commands from the user. The record processing circuit 62 carries out processing required for recording on the recording medium 63 for the data from the selection switch 60, and records on the recording medium 63.

However, in the above-mentioned conventional receiver, it was necessary to provide two input terminals for inputting the SDI data and the SDTI data, respectively, in order to carry out predetermined data processing for the SDI data and the SDTI data, respectively. For this reason, in the conventional receiver, the number of input terminals was unable to be reduced, and the configuration of the receiver was unable to be simplified. Therefore, in the conventional receiver, it was difficult to reduce its cost.

In the conventional receiver, it was necessary to previously check whether digital data to be transmitted was the SDI data or the SDTI data. In other words, in the conventional receiver, it was necessary to previously check whether the digital data was transmitted in accordance with the transmission format of the SDI Standard or the SDTI Standard. Furthermore, in the SDTI Standard, since uncompressed video data can also be placed in the payloads and transmitted, it was also necessary to previously check whether the video data included in the SDTI data was uncompressed data or compressed data. Therefore, in the conventional receiver, it was necessary to properly connect cables to the corresponding input terminals and processing circuits on the basis of the data transmission format and the presence or absence of compression of the video data checked previously.

The conventional receiver was configured so that the external selector was used to select the SDI-based processing circuit or the SDTI-based processing circuit, and so that the selection switch carried out selection to record data on the recording medium. Therefore, in the conventional receiver, when the selection of the processing circuit was performed incorrectly, the received digital data was unable to be recorded on the recording medium occasionally.

When the conventional receiver was used for a system wherein the SDI data and the SDTI data are mixed, it was necessary to use two cables so that one cable was connected to the input terminal for the SDI data, and so that the other cable was connected to the input terminal for the SDTI data. For this reason, when the conventional receiver was used for the above-mentioned system, the number of cables used in the system increased, and the configuration of the system became complicated. Furthermore, in this system, when the receiver was operated by using only one cable, it was necessary to perform an operation of connecting the cable to the corresponding input terminal in accordance with digital data to be received by the receiver, thereby requiring labor and time for the setup operation of the system.

DISCLOSE OF THE INVENTION

An object of the present invention is to provide a receiver and a transmitter/receiver capable of receiving compressed (bit rate reduced) video data and uncompressed video data without using plural input terminals, and also capable of automatically distinguishing and carrying out proper data processing.

In order to achieve the above-mentioned object, a receiver in accordance with the present invention comprises:
- input means for inputting digital data including uncompressed video data or bit rate reduced video data,
- receiving means for receiving the digital data output from the input means,
- distinguishing means for distinguishing the digital data output from the receiving means,
- first decoding means for taking out the uncompressed video data from the digital data output from the receiving means,
- bit rate reduction means for carrying out bit rate reduction processing for the video data from the first decoding means,
- second decoding means for taking out the bit rate reduced video data from the digital data output from the receiving means,
- selection means for selecting the data from the bit rate reduction means and the data from the second decoding means, and
- control means for controlling the selection means on the basis of the result of the distinguishing of the distinguishing means.

According to this configuration, the receiver of the present invention can input the bit rate reduced video data or the uncompressed video data via a common input terminal without using plural input terminals. Furthermore, the receiver can distinguish the video data automatically and can carry out proper data processing.

A receiver in accordance with another aspect of the present invention comprises:
- input means for inputting digital data including uncompressed video data or bit rate reduced video data,
- receiving means for receiving the digital data output from the input means,
- distinguishing means for distinguishing the digital data output from the receiving means,
- first decoding means for taking out the uncompressed video data from the digital data output from the receiving means,
- bit rate reduction means for carrying out bit rate reduction processing for the video data from the first decoding means,
- second decoding means for taking out the bit rate reduced video data from the digital data output from the receiving means,
- selection means for outputting the digital data output from the receiving means to the first decoding means or the second decoding means, and
- control means for controlling the selection means on the basis of the result of the distinguishing of the distinguishing means.

According to this configuration, the bit rate reduced video data or the uncompressed video data can be input via a common input terminal without using plural input terminals. Furthermore, the video data can be distinguished automatically, and proper data processing can be carried out.

A transmitter/receiver in accordance with the present invention comprises:
- input means for inputting digital data including uncompressed video data or bit rate reduced video data,
- receiving means for receiving the digital data output from the input means,
- distinguishing means for distinguishing the digital data output from the receiving means,
- first decoding means for taking out the uncompressed video data from the digital data output from the receiving means,
- bit rate reduction means for carrying out bit rate reduction processing for the video data from the first decoding means,
- second decoding means for taking out the bit rate reduced video data from the digital data output from the receiving means,
- selection means for selecting data from the bit rate reduction means and the data from the second decoding means,
- control means for controlling the selection means on the basis of the result of the distinguishing of the distinguishing means, and
- transmitting means for transmitting the data from the selection means to an external device.

According to this configuration, the bit rate reduced video data or the uncompressed video data can be input via a common input terminal without using plural input terminals. Furthermore, the video data can be distinguished automatically, and proper data processing can be carried out.

A transmitter/receiver in accordance with another aspect of the present invention comprises:

input means for inputting digital data including uncompressed video data or bit rate reduced video data, receiving means for receiving the digital data output from the input means, distinguishing means for distinguishing the digital data output from the receiving means, first decoding means for taking out the uncompressed video data from the digital data output from the receiving means, bit rate reduction means for carrying out bit rate reduction processing for the video data from the first decoding means, second decoding means for taking out the bit rate reduced video data from the digital data output from the receiving means, selection means for outputting the digital data output from the receiving means to the above-mentioned first decoding means or the second decoding means, control means for controlling the selection means on the basis of the result of the distinguishing of the distinguishing means, and transmitting means for transmitting the data from the selection means to an external device.

According to this configuration, the bit rate reduced video data or the uncompressed video data can be input via a common input terminal without using plural input terminals. Furthermore, the video data can be distinguished automatically, and proper data processing can be carried out.

While the novel features of the present invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

BEST MODE FOR CARRYING OUT THE INVENTION

Hereinafter, preferred embodiments of a receiver and a transmitter/receiver in accordance with the present invention will be described with reference to the accompanying drawings.

FIRST EMBODIMENT

Figure 1:
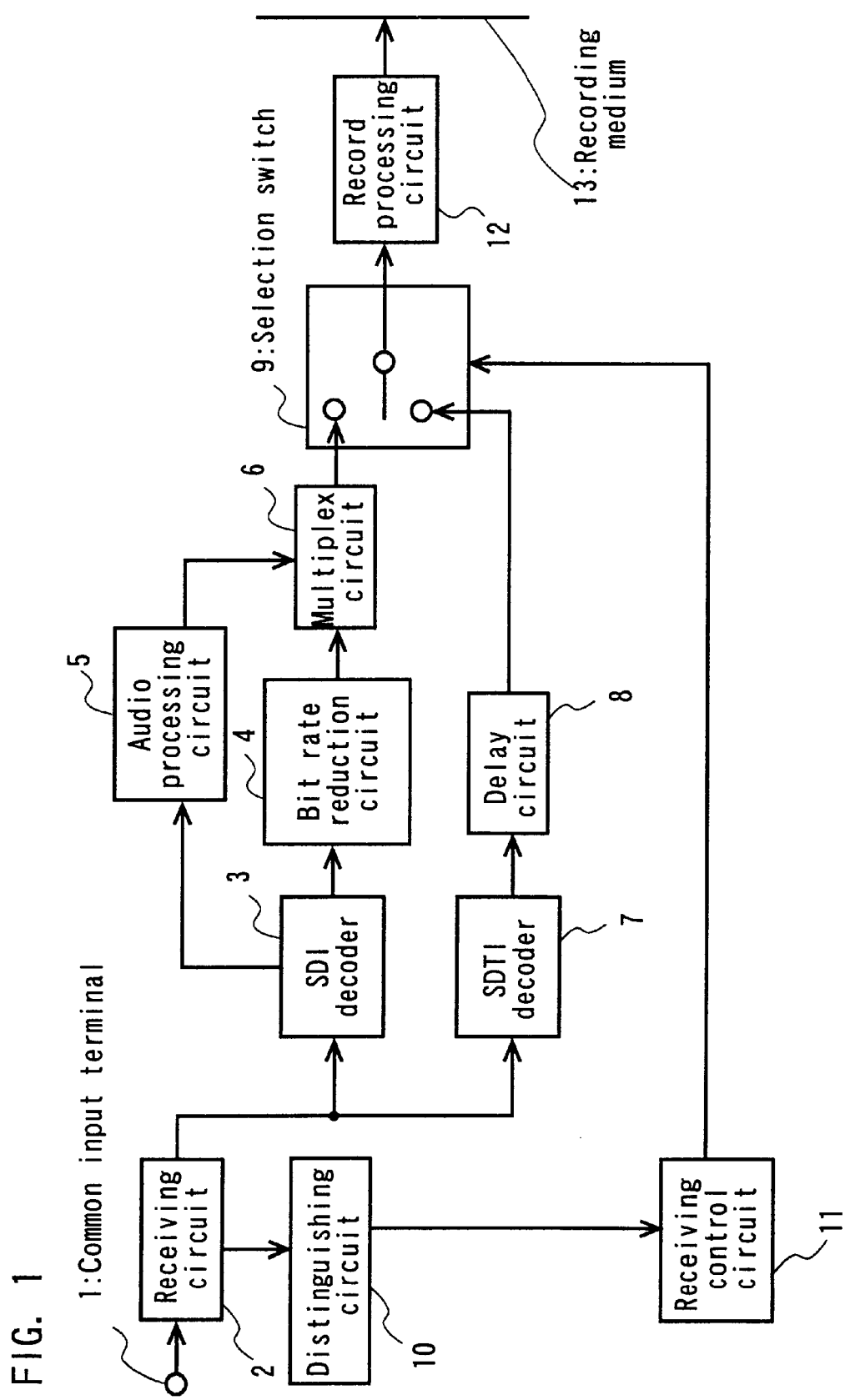
FIG. 1 is a block diagram showing a configuration of a receiver in accordance with a first embodiment of the present invention.

FIG. 1 is a block diagram showing a configuration of a receiver in accordance with a first embodiment of the present invention. In the following description, a receiver for receiving transmitted digital data on the basis of the SDI Standard or the SDTI Standard mentioned above will be described to make comparison with the conventional example easy.

As shown in FIG. 1, the receiver of the present embodiment is provided with a receiving circuit 2 connected to a common input terminal 1, an SDI decoder 3 connected to the above-mentioned receiving circuit 2 and used to process digital data including uncompressed video data, a bit rate reduction circuit 4, an audio processing circuit 5 and a multiplex circuit 6. The receiver of the present embodiment is provided with an SDTI decoder 7 connected to the above-mentioned receiving circuit 2 and used to process digital data including video data compressed by a bit rate reduction method, a delay circuit 8, and a selection switch 9 for carrying out selection between the multiplex circuit 6 and the delay circuit 8 mentioned above. Furthermore, the receiver of the present embodiment is provided with a distinguishing circuit 10 for distinguishing the digital data received by the receiving circuit 2, a receiving control circuit 11 for controlling the selection switch 9 on the basis of the result of the distinguishing of the above-mentioned distinguishing circuit 10, and a record processing circuit 12 for recording the digital data from the above-mentioned selection switch 9 on a recording medium 13.

The common input terminal 1 is preferably formed of the BNC terminal stipulated in the SDTI Standard or a similar terminal. A coaxial cable constituting a transmission path for digital data, for example, is connected to this common input terminal 1.

The common input terminal 1 constitutes an input means for inputting digital data including uncompressed video data or video data compressed by the bit rate reduction method. The DV format and the MPEG Standard are included as concrete examples of the bit rate reduction method.

The receiving circuit 2 constitutes a receiving means for receiving the digital data output from the above-mentioned input means, and carries out serial-parallel conversion processing for the received digital data. The receiving circuit 2 outputs the data subjected to the serial-parallel conversion processing to the SDI decoder 3, the SDTI decoder 7 and the distinguishing circuit 10.

The SDI decoder 3 separates uncompressed video data and audio data from the digital data input from the receiving circuit 2, and outputs the separated video data and audio data to the bit rate reduction circuit 4 and the audio processing circuit 5, respectively. The SDI decoder 3 constitutes a first decoding means for taking out uncompressed video data from the digital data output from the above-mentioned receiving means.

The bit rate reduction circuit 4 carries out bit rate reduction processing for the video data from the SDI decoder 3, and outputs to the multiplex circuit 6. This bit rate reduction circuit 4 is previously selected and set to carry out known bit rate reduction processing, for example, one of bit rate reduction processing methods, that is, the bit rate reduction (compression) processing in accordance with the MPEG Standard, or in the 25 Mbps mode or the 50 Mbps mode in accordance with the DV format.

The audio processing circuit 5 carries out predetermined data processing including interleave processing for the input audio data from the SDI decoder 3, and outputs to the multiplex circuit 6.

The multiplex circuit 6 multiplexes the bit rate reduced video data from the bit rate reduction circuit 4 and the interleaved audio data from the audio processing circuit 5 in a predetermined sequence, and outputs to the selection switch 9.

SDTI decoder 7 carries out deformatting processing for the digital data input from the receiving circuit 2, and outputs to the delay circuit 8. In other words, the SDTI decoder 7 takes out compressed video data, interleaved audio data, VAUX data, AAUX data and sub-code data from the data blocks placed in the payloads, and outputs to the delay circuit 8. The SDTI decoder 7 constitutes a second decoding means for taking out the bit rate reduced video data from the digital data output from the above-mentioned receiving means.

The delay circuit 8 outputs digital data including the compressed video data from the SDTI decoder 7 with a predetermined time delay. More specifically, the delay circuit 8 delays the time taken after the above-mentioned digital data is input to the SDTI decoder 7 and until the data is input to the selection switch 9 so that the time coincides with the time taken after the digital data received by the receiving circuit 2 is input to the SDI decoder 3 and until the data is input from the multiplex circuit 8 to the selection switch 9.

As a result, the timing of data output to the selection switch 9 from the multiplex circuit 6 can be aligned with that from the delay circuit 8, whereby recording is made possible on the recording medium 13 without changing the operation timing at the subsequent record processing circuit 13.

The selection switch 9 carries out selection between the multiplex circuit 6 and the delay circuit 8 on the basis of the control signal from the receiving control circuit 11, and outputs the data output from one of the two circuits. Even when the compressed video data is processed sequentially by the SDI decoder 3, the bit rate reduction circuit 4 and the multiplex circuit 6, and output for example, only the data processed properly by the SDTI decoder 7 can be output to the record processing circuit 12 by providing this selection switch 9.

The distinguishing circuit 10 distinguishes the type of the digital data input from the receiving circuit 2, and outputs the result of the distinguishing to the receiving control circuit 11 as a distinguishing signal. In more detail, the distinguishing circuit 10 uses the ancillary data multiplexed in the horizontal blanking period of the television signal from among the input digital data to distinguish the transmission format of the digital data. Furthermore, the distinguishing circuit 10 distinguishes whether the video data included in the digital data is compressed or not, and outputs the result of the distinguishing to the receiving control circuit 11 as a distinguishing signal.

Figure 6:
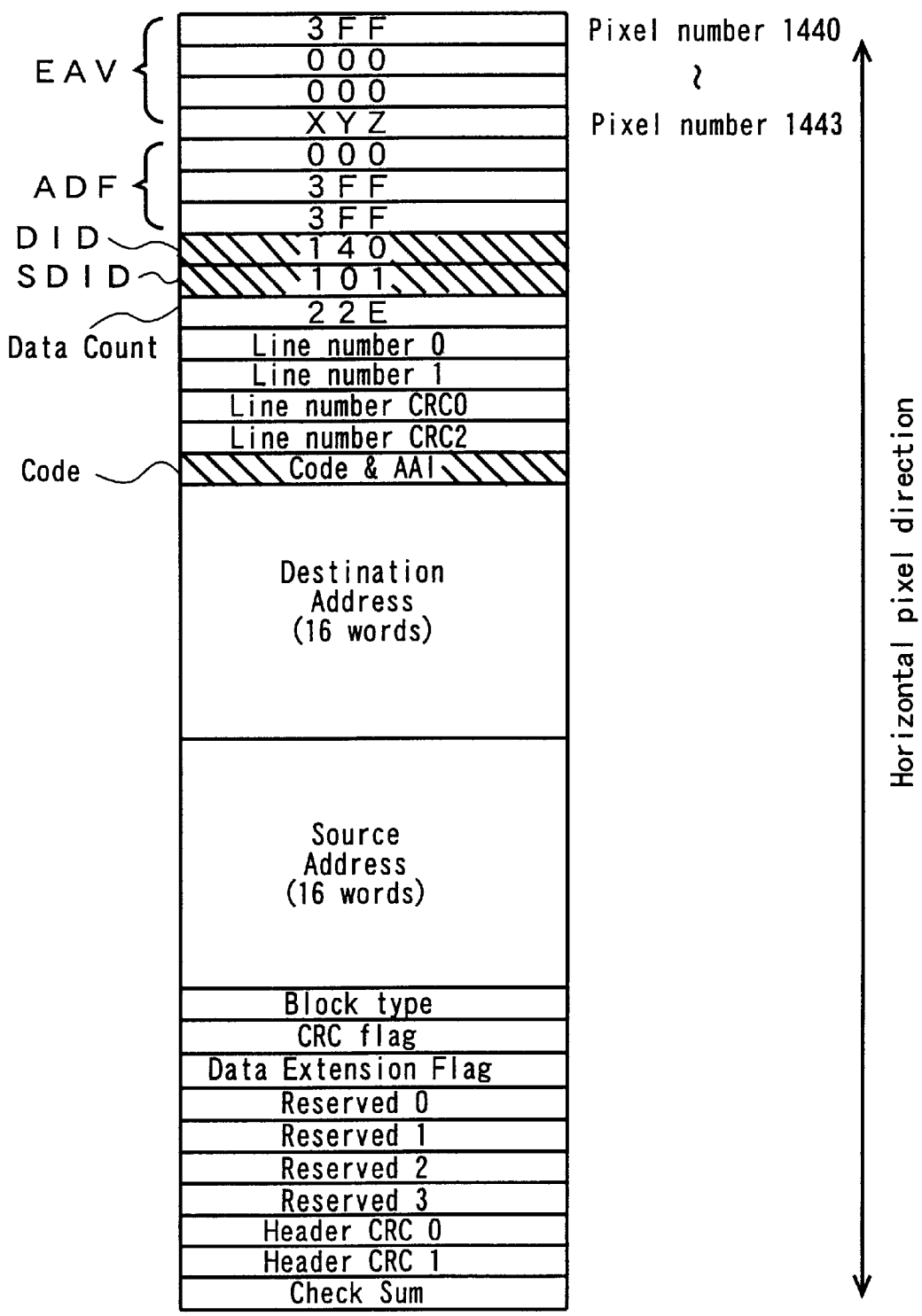
FIG. 6 is an explanatory view showing a specific configuration of an SDTI header.
Figure 7:
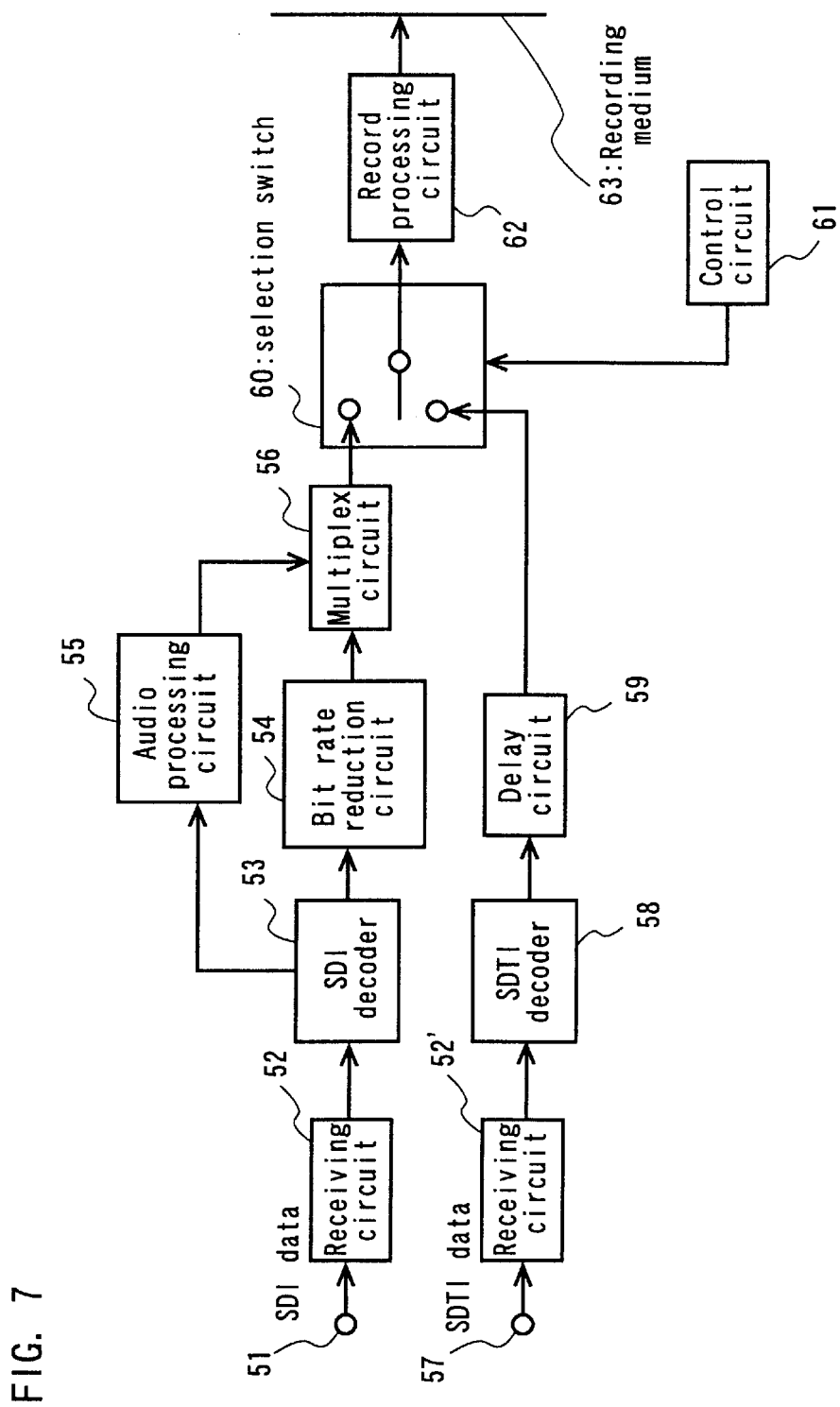
FIG. 7 is a block diagram showing a configuration of a conventional receiver.

More specifically, on the basis of the value of the ADF (Ancillary Data Flag) of the input ancillary data, the distinguishing circuit 10 distinguishes whether the digital data is transmitted in accordance with the transmission format of the SDI Standard or the SDTI Standard. On the basis of the values of DID and SDID, the distinguishing circuit 10 distinguishes whether the SDTI header (FIG. 6) stipulated in the SDTI Standard is included in the ancillary data or not. More specifically, in the case that the values of DID and SDID are "140" and "101", respectively, the distinguishing circuit 10 distinguishes that the data of the SDTI header is included in the input ancillary data. Furthermore, the distinguishing circuit 10 distinguishes the presence or absence of the compression of the video data and the number of words per line by using the values of the codes included in the SDTI header. More specifically, in the case that the values of the codes are "0001b" or "0010b", respectively, the distinguishing circuit 10 distinguishes that the input digital data is transmitted at 1440 words or 1920 words per line in accordance with the transmission format of the SDTI Standard, and also distinguishes that the video data has been compressed.

In the case that the values of DID and SDID are values other than the above-mentioned values, the distinguishing circuit 10 carries out distinguishes that the input digital data is transmitted in accordance with the transmission format of the SDI Standard, and also distinguishes that the video data is not compressed. In the same way, in the case that the value of the code is "0000b", the distinguishing circuit 10 distinguishes that the input digital data is transmitted in accordance with the transmission format of the SDI Standard, and also distinguishes that the video data is not compressed.

As described in the above, by using the ancillary data, the distinguishing circuit 10 distinguishes the transmission format of the input digital data and the presence or absence of the compression of the video data, and outputs the result of the distinguishing to the receiving control circuit 11 as a distinguishing signal.

The receiving control circuit 11 generates a control signal and outputs to the selection switch 9 on the basis of the distinguishing signal from the above-mentioned distinguishing circuit 10. More in detail, in the case that the distinguishing signal indicates that the uncompressed video data is included in the input digital data, the receiving control circuit 11 generates a control signal for commanding that the multiplex circuit 6 should be connected to the record processing circuit 12, and outputs to the selection switch 9. Furthermore, in the case that the distinguishing signal indicates that the compressed video data is included in the input digital data, the receiving control circuit 11 generates a control signal for commanding that the delay circuit 8 should be connected to the record processing circuit 12, and outputs to the selection switch 9.

The record processing circuit 12 inputs the data from the selection switch 9, carries out processing necessary for recording on the recording medium 13, and carries out recording. Therefore, recording can be carried out in accordance with the recording format best suited for the recording medium 13. The processing at the record processing circuit 12 includes processing for adding an addition signal indicating information, such as recording time and playback sequence, to the data. In addition, concrete examples of the recording medium 13 are magnetic tape and a hard disk device.

As described in the above, in the receiver of the present embodiment, the common input terminal 1 inputs digital data including the uncompressed video data or the compressed video data, and the receiving circuit 2 carries out serial-parallel conversion processing for the input digital data, and outputs to the SDI decoder 3, the SDTI decoder 7 and the distinguishing circuit 10. For this reason, the number of input terminals in the receiver of the present embodiment can be made less than that of the conventional example, whereby the configuration of the receiver can be simplified. Therefore, the cost of the receiver of the present embodiment can be reduced easily. Thus, when the receiver of the present embodiment is used for a system wherein SDI data and SDTI data are mixed, the configuration of the system can also be simplified, without increasing the number of cables used for the system.

Furthermore, the receiver of the present embodiment is configured so that the distinguishing circuit 10 distinguishes the transmission format of the input digital data and the presence or absence of the compression of the video data, so that the selection switch 9 selects data to be output from the SDI decoder 3 or the SDTI decoder 7 on the basis of the result of the distinguishing of the distinguishing circuit 10, and so that recording is carried out on the recording medium 13. Therefore, in the receiver of the present embodiment, data obtained by properly data processing the received data can be recorded on the record medium 13.

In the above-mentioned description, the configuration wherein the receiving circuit 2 outputs all the digital data output from the common input terminal 1 to the distinguishing circuit 10 is described, however, it may be possible to use a configuration wherein only the ancillary data multiplexed and transmitted in the horizontal blanking period of the television signal is output to the distinguishing circuit 10.

Furthermore, in addition to the above-mentioned description, it may be possible to use a configuration wherein at least one of the decoders, namely, one of the SDI decoder 3 and the SDTI decoder 7, is provided with the distinguishing function used at the distinguishing circuit 10, thereby to omit the distinguishing circuit 10. In the case of this configuration, the receiving control circuit can also be omitted by adding a function of generating a control signal for the selection switch to the decoder having the distinguishing function.

Moreover, in addition to the above-mentioned description, the compression processing performed by the bit rate reduction circuit 4 is made changeable. More specifically, it may be possible to use a configuration wherein the bit rate reduction circuit 4 is formed by using hardware for performing compression processing in the 25 Mbps mode and the 50 Mbps mode in accordance with the DV format for example, and compression processing in either mode is selected and carried out for the video data input for the SDI decoder 3. Therefore, in the case that the video data received the last time was the compressed data for example, the same compression processing as that for the compressed video data can be carried out for the uncompressed video data received this time, whereby only the video data subjected to the same compression processing can be recorded easily on the recording medium 13.

SECOND EMBODIMENT

Figure 2:
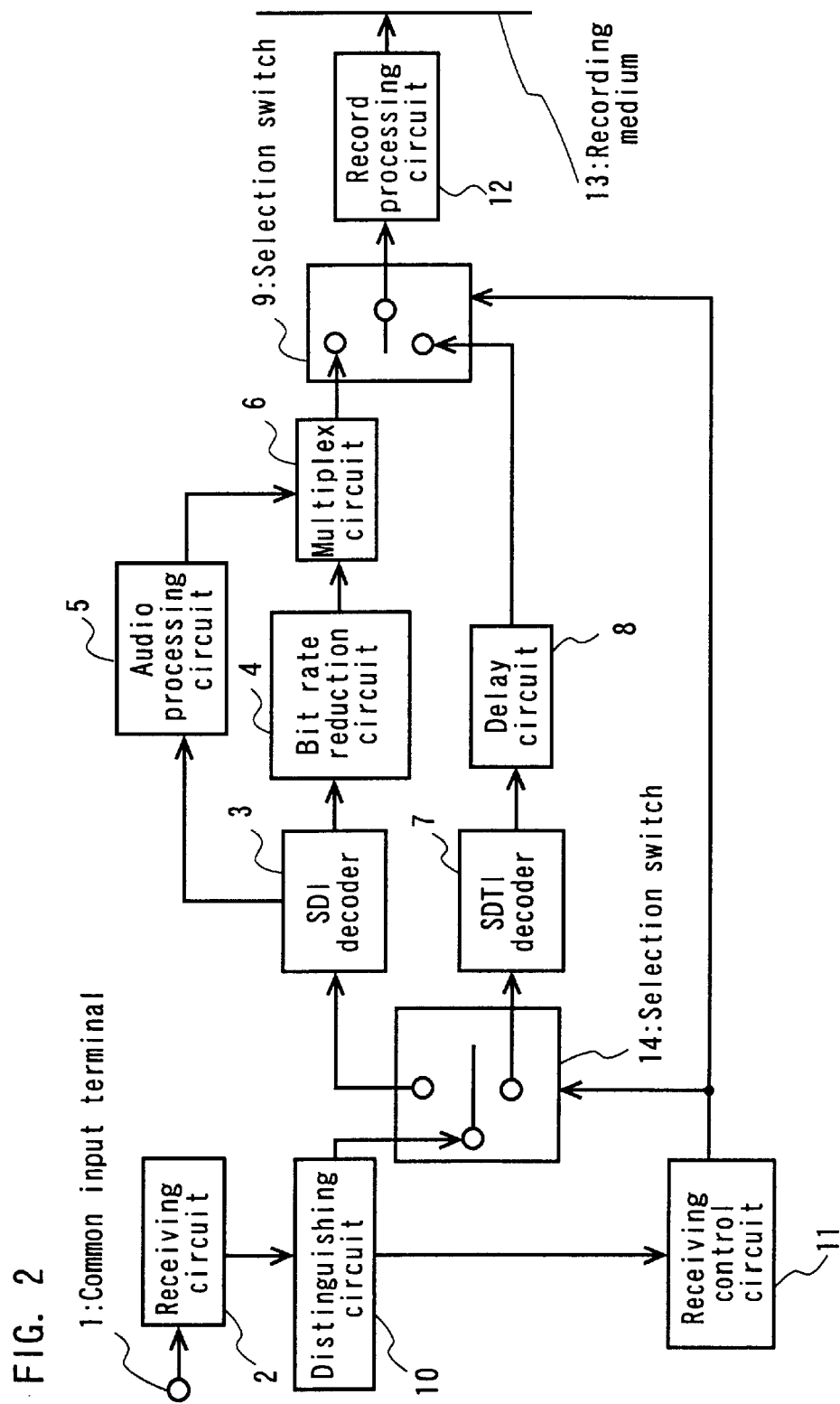
FIG. 2 is a block diagram showing a configuration of a receiver in accordance with a second embodiment of the present invention.

FIG. 2 is a block diagram showing a configuration of a receiver in accordance with a second embodiment of the present invention. In this embodiment, in the configuration of the receiver, a selection switch to be switched by the receiving control circuit is provided between the distinguishing circuit and the SDI decoder and the SDTI decoder. The other elements and portions are similar to those of the first embodiment, and therefore superposed descriptions on the similar points are omitted.

As shown in FIG. 2, in the receiver of the present embodiment, only the distinguishing circuit 10 is connected to the receiving circuit 2, and the SDI decoder 3 and the SDTI decoder 7 are connected to the distinguishing circuit 10 via a selection switch 14. On the basis of a control signal from the receiving control circuit 11, the selection switch 14 operates interlocked with the selection switch 9, thereby carrying out selection between the SDI decoder 3 and the SDTI decoder 7, and outputting the digital data from the distinguishing circuit 10 to one of the decoders. More specifically, in the case that the distinguishing signal indicates that the uncompressed video data is included in the input digital data, the receiving control circuit 11 generates the control signal commanding that the distinguishing circuit 10 should be connected to the SDI decoder 3, and outputs to the selection switch 14. Therefore, the digital data from the distinguishing circuit 10 is output only to the SDI decoder 3 via the selection switch 14.

Furthermore, in the case that the distinguishing signal indicates that the compressed video data is included in the input digital data, the receiving control circuit 11 generates the control signal commanding that the distinguishing circuit 10 should be connected to the SDTI decoder 7, and outputs to the selection switch 14. Therefore, the digital data from the distinguishing circuit 10 is output only to the SDTI decoder 7 via the selection switch 14.

As described in the above, in the receiver of the present embodiment, the input digital data is output only to one of the decoders, i.e., the SDI decoder 3 or the SDTI decoder 7, wherein data processing is carried out. As a result, in addition to the effects obtained in the first embodiment, the receiver of the present embodiment can stop one of the processing circuits, such as the decoder wherein data processing is not carried out, whereby the power consumption of the receiver can be reduced. Furthermore, since one of the processing circuits is stopped, noise generation due to the operation thereof can be prevented.

In the above-mentioned description, the configuration wherein the two selection switches 9 and 14 operate interlocked with each other on the basis of the control signal of the receiving control circuit 11 is described, however, it may be possible to use a configuration wherein the multiplex circuit 6 and the delay switch 8 are directly connected to the record processing circuit 12, and the selection switch 9 is omitted.

Furthermore, in addition to the above-mentioned description, it may be possible to use a configuration wherein the SDI decoder 3 and the SDTI decoder 7 are provided with the distinguishing function used at the distinguishing circuit 10, thereby to omit the distinguishing circuit 10. In the case of this configuration, the receiving control circuit can also be omitted by adding a function of generating a control signal for the selection switch to the decoders having the distinguishing function.

THIRD EMBODIMENT

Figure 3:
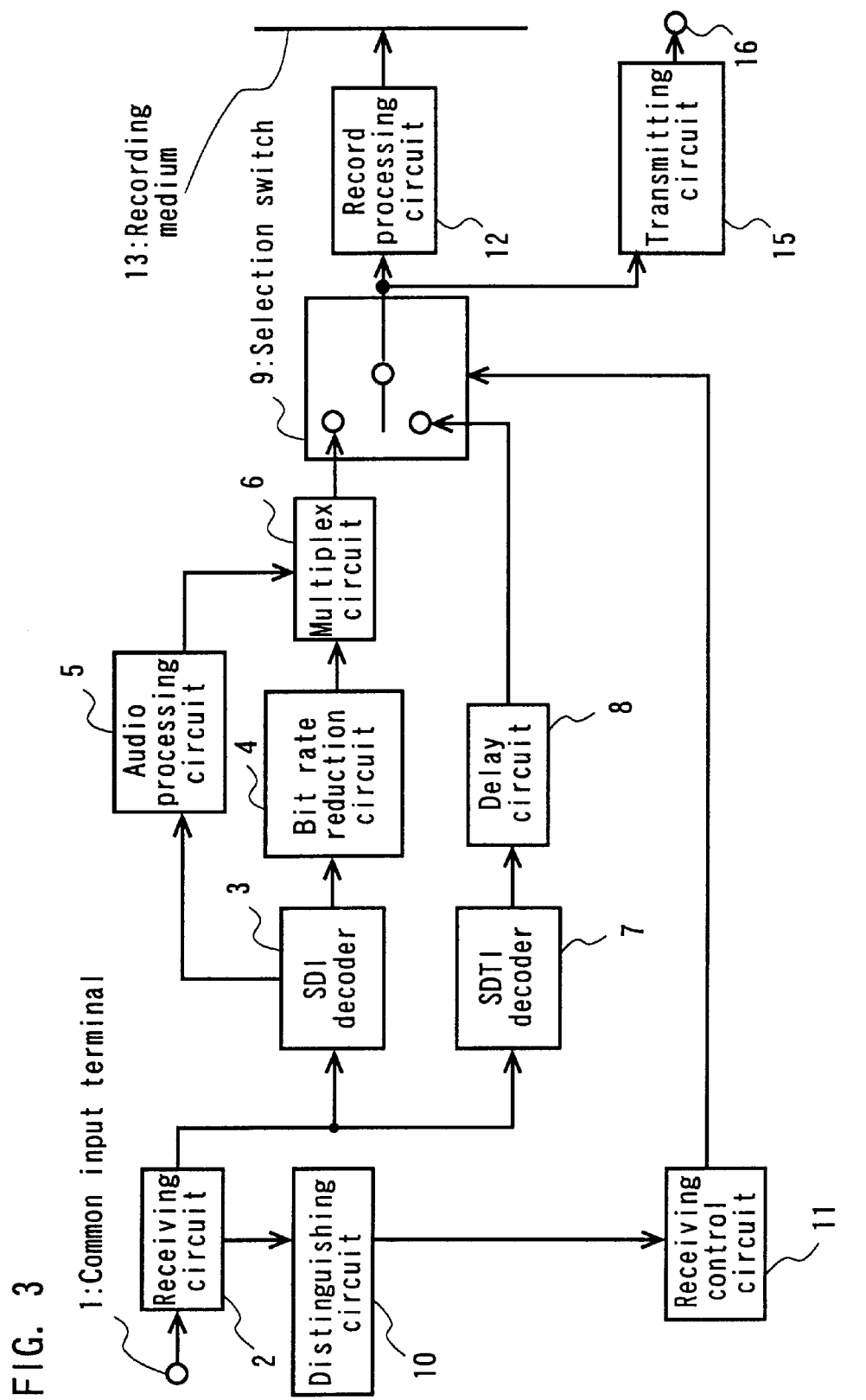
FIG. 3 is a block diagram showing a configuration of a receiver in accordance with a third embodiment of the present invention.
Figure 4:
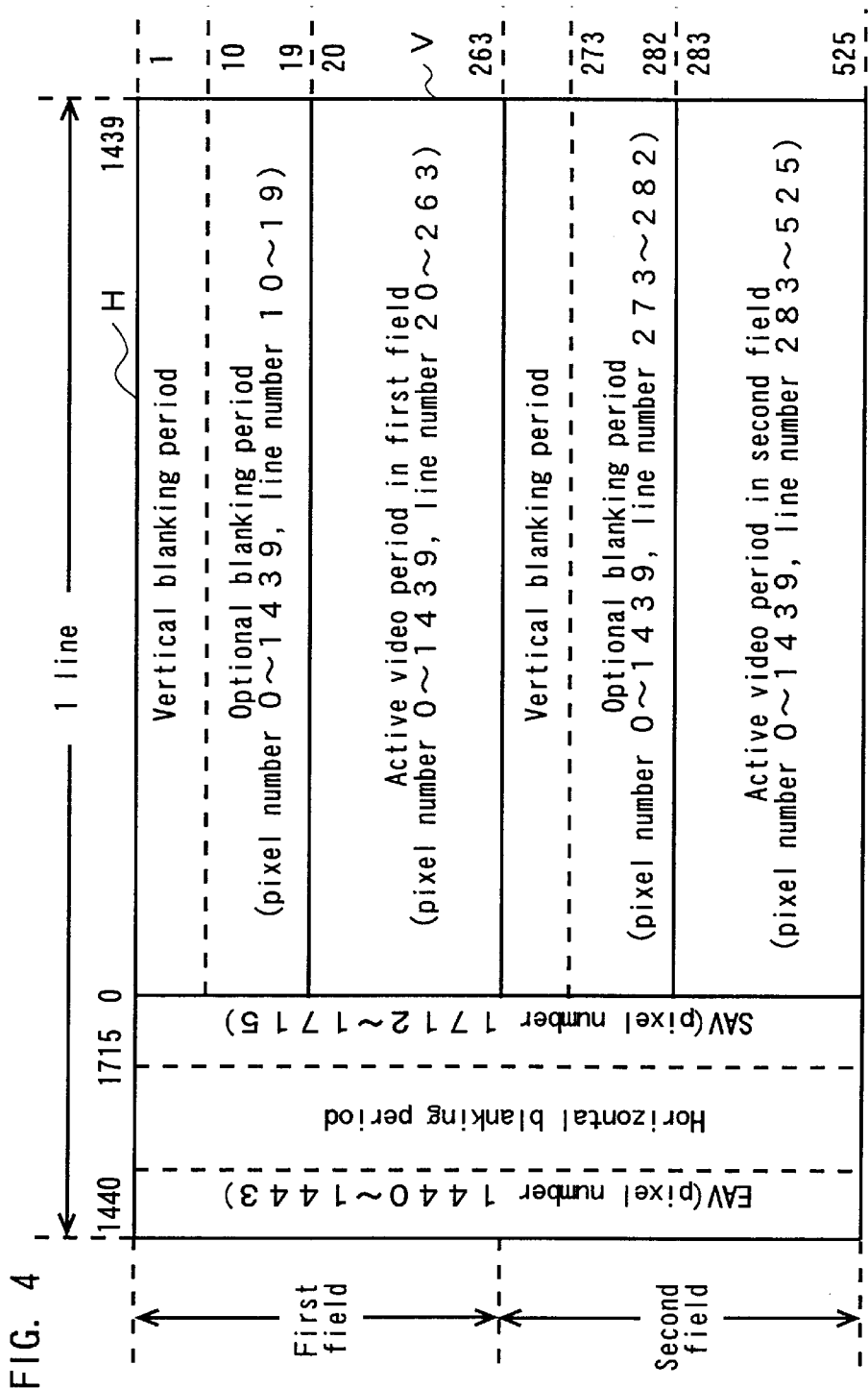
FIG. 4 is an explanatory view showing the configuration of one frame in accordance with the SDI Standard.
Figure 5:
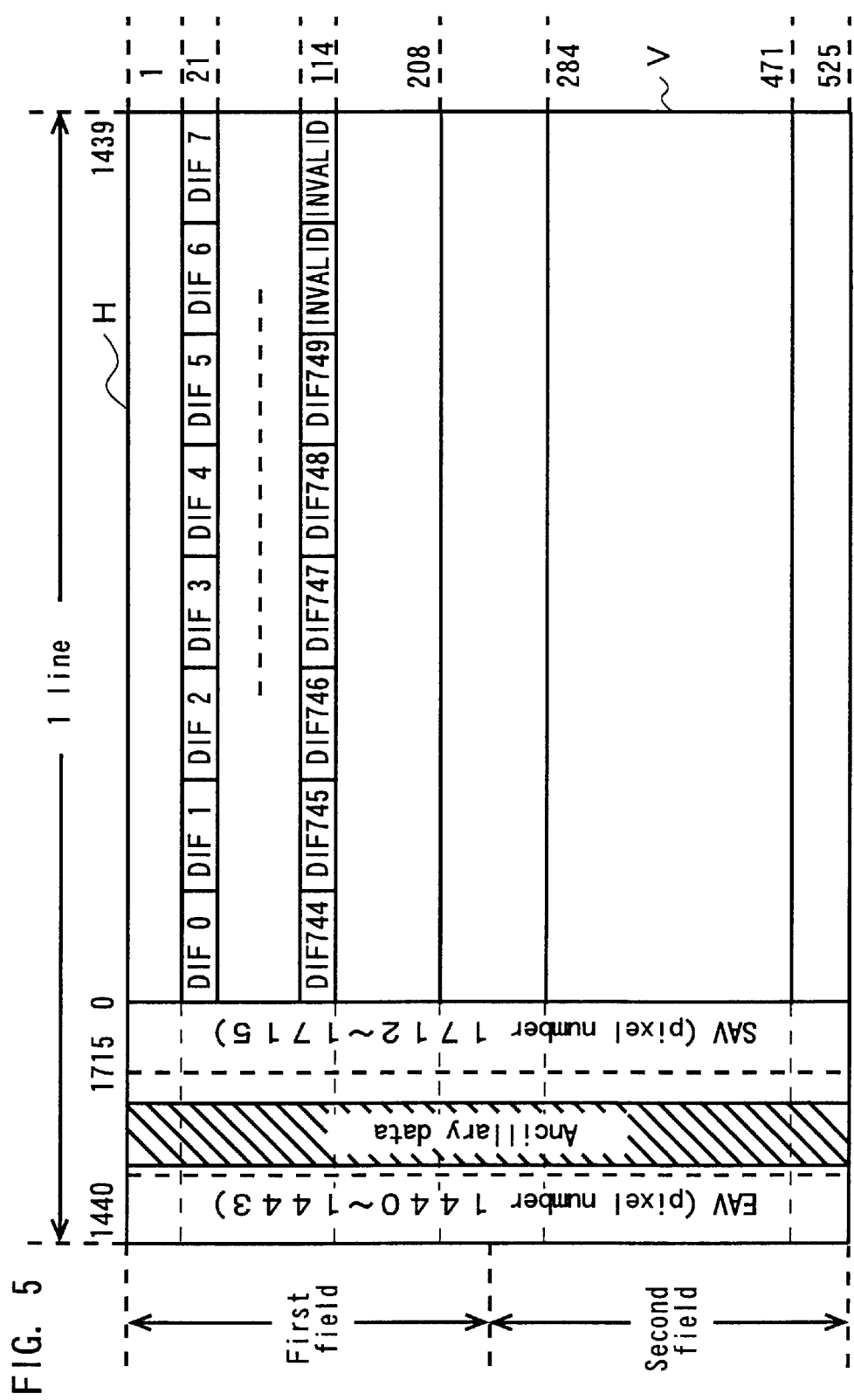
FIG. 5 is an explanatory view showing the configuration of one frame in accordance with the SDTI Standard.

FIG. 3 is a block diagram showing a configuration of a transmitter/receiver in accordance with a third embodiment of the present invention.

In FIG. 3, in the transmitter/receiver of the present embodiment, a transmitting circuit 15 for performing data transmission and an output terminal 16 are connected to the output side of the selection switch 9 of the receiver shown in FIG. 1. This transmitting circuit 15 transmits the data input from the selection switch 9 to an external device via the output terminal 16 in accordance with the serial transmission system, the parallel transmission system or the analog transmission system, for example. Concrete examples of a device at the destination of transmission are a recording/reproducing device, a nonlinear editing device and a display device.

By the above-mentioned configuration, in addition to the effects obtained in Embodiment 1, the transmitter/receiver of the present embodiment can output data subjected to proper data processing to the external device.

In addition to the above-mentioned description, it may be possible to use a configuration wherein the transmitting circuit 15 and the output terminal 16 are connected to the receiver shown in FIG. 2, thereby to form a transmitter/receiver.

Furthermore, in addition to the above-mentioned description of each embodiment, it may be possible to use a configuration wherein the selection switch 9 is connected to a reproducing processing circuit and a monitor, thereby to play back and display the data subjected to data processing.

Moreover, the control of the selection switch by the receiving control circuit is described in the case when automatic selection is carried out on the basis of the distinguishing signal, however, it may be possible to use a configuration wherein a known input device including a ten-key pad is used to control the selection switch.1

Besides, in the above-mentioned description of each embodiment, an example wherein the delay circuit 8 is connected to the SDTI decoder 7 is described, however, when it is not necessary to align the time taken for processing the uncompressed video data with the time taken for processing the compressed video data, the delay circuit 8 may be omitted.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

Industrial Applicability

The present invention is usable for a receiver and a transmitter/receiver for digital data including video data and audio data, more particularly for a receiver and a transmitter/receiver best suited for a recording/reproducing device for recording and reproducing uncompressed video data and compressed video data.

What is claimed is:

1. A receiver comprising:
input means for inputting digital data including uncompressed video data or bit rate reduced video data,
receiving means for receiving the digital data output from said input means,
distinguishing means for distinguishing the digital data output from said receiving means,
first decoding means for taking out said uncompressed video data from the digital data output from said receiving means,
bit rate reduction means for carrying out bit rate reduction processing for the video data from said first decoding means,
second decoding means for taking out said bit rate reduced video data from the digital data output from said receiving means,
selection means for selecting the data from said bit rate reduction means and the data from said second decoding means, and
control means for controlling said selection means on the basis of the result of the distinguishing of said distinguishing means.

2. A receiver comprising:
input means for inputting digital data including uncompressed video data or bit rate reduced video data,
receiving means for receiving the digital data output from said input means,
distinguishing means for distinguishing the digital data output from said receiving means,
first decoding means for taking out said uncompressed video data from the digital data output from said receiving means,
bit rate reduction means for carrying out bit rate reduction processing for the video data from said first decoding means,
second decoding means for taking out said bit rate reduced video data from the digital data output from said receiving means,
selection means for outputting the digital data output from said receiving means to said first decoding means or said second decoding means, and
control means for controlling said selection means on the basis of the result of the distinguishing of said distinguishing means.

3. A receiver in accordance with claim 1 or 2, wherein said distinguishing means distinguishes whether the video data included in said digital data input by said input means is compressed or not on the basis of ancillary data multiplexed in a horizontal blanking period.

4. A receiver in accordance with claim 1, wherein,
in the case that said distinguishing means distinguishes that uncompressed video data is included in said input digital data, said control means controls said selection means to select the data from said bit rate reduction means, and
in the case that said distinguishing means distinguishes that bit rate reduced video data is included in said input digital data, said control means controls said selection means to select the data from said second decoding means.

5. A receiver in accordance with claim 2, wherein,
in the case that said distinguishing means distinguishes that uncompressed video data is included in said input digital data, said control means controls said selection means to output the input digital data to said first decoding means, and
in the case that said distinguishing means distinguishes that bit rate reduced video data is included in said input digital data, said control means controls said selection means to output the input digital data to said second decoding means.

6. A transmitter/receiver comprising:
input means for inputting digital data including uncompressed video data or bit rate reduced video data,
receiving means for receiving the digital data output from said input means,
distinguishing means for distinguishing the digital data output from said receiving means,
first decoding means for taking out said uncompressed video data from the digital data output from said receiving means, bit rate reduction means for carrying out bit rate reduction processing for the video data from said first decoding means, second decoding means for taking out said bit rate reduced video data from the digital data output from said receiving means, selection means for selecting the data from said bit rate reduction means and the data from said second decoding means, control means for controlling said selection means on the basis of the result of the distinguishing of said distinguishing means, and transmitting means for transmitting the data from said selection means to an external device.

7. A transmitter/receiver comprising:

input means for inputting digital data including uncompressed video data or bit rate reduced video data, receiving means for receiving the digital data output from said input means, distinguishing means for distinguishing the digital data output from said receiving means, first decoding means for taking out said uncompressed video data from the digital data output from said receiving means, bit rate reduction means for carrying out bit rate reduction processing for the video data from said first decoding means, second decoding means for taking out said bit rate reduced video data from the digital data output from said receiving means, selection means for outputting the digital data output from said receiving means to said first decoding means or said second decoding means, control means for controlling said selection means on the basis of the result of the distinguishing of said distinguishing means, and transmitting means for transmitting the data from said selection means to an external device.

* * * * *